United States Patent [19]
Pinson

[11] Patent Number: 4,735,382
[45] Date of Patent: Apr. 5, 1988

[54] SPACE CRAFT CELLULAR ENERGY GENERATING AND STORAGE DEVICE

[75] Inventor: George T. Pinson, Huntsville, Ala.
[73] Assignee: The Boeing Company, Seattle, Wash.
[21] Appl. No.: 819,134
[22] Filed: Jan. 15, 1986

Related U.S. Application Data
[63] Continuation-in-part of Ser. No. 546,380, Oct. 28, 1983, abandoned.

[51] Int. Cl.⁴ .......................... G64G 1/42; G64G 1/44
[52] U.S. Cl. ................................... 244/159; 244/165; 244/173; 60/641.8; 322/4; 318/150; 74/572; 290/55
[58] Field of Search .................. 244/158 R, 159, 173, 244/165; 60/641.8; 322/4; 318/150, 161; 290/1 R, 55; 310/74, 102 R, 115, 118, 153; 74/572, 573

[56] References Cited
U.S. PATENT DOCUMENTS

| | | | |
|---|---|---|---|
| 2,153,523 | 4/1939 | Roberts et al. | 290/55 |
| 3,144,219 | 8/1964 | Schnitzer | 244/159 |
| 3,248,967 | 5/1966 | Lewis | 74/572 |
| 3,526,795 | 9/1970 | Pees | 244/165 |
| 3,697,765 | 10/1972 | Carini | 290/55 |
| 3,970,917 | 7/1976 | Diggs | 290/1 R |
| 4,509,006 | 4/1985 | Pinson . | |
| 4,546,264 | 10/1985 | Pinson . | |

OTHER PUBLICATIONS
Miller et al., "Sys. Design of a Flywheel Energy Storage and Conversion Sys. for Photovoltaic Applic." –IEEE of Conf. 1-7-1980, pp. 1018-1024.

*Primary Examiner*—Galen Barefoot
*Attorney, Agent, or Firm*—Finnegan, Henderson, Farabow, Garrett & Dunner

[57] ABSTRACT

A space craft cellular energy generating and storage device for generating electrical power in space and storing the power for extended periods of time. The space craft generating and storage device characterized by having a pair of annular rotating housings having a plurality of individual compartments therein. The compartments receiving material which is compartmentalized to accurately control the mass distribution during the rotation of the housing for maintaining speed as energy is withdrawn or generated.

7 Claims, 5 Drawing Sheets

SPACE CRAFT CELLULAR ENERGY GENERATING AND STORAGE DEVICE

BACKGROUND OF THE INVENTION

This application is a continuation-in-part of an application by the same title filed by the subject inventor on Oct. 28, 1983 and given Ser. No. 546,380, now abandoned.

This invention relates to an electrical energy generating and storage device and, more particularly but not by way of limitation, to a space craft rotating cellular energy generating and storage device capable of storing energy for extended periods of time so the energy can be immediately available for use at a later time.

Heretofore, a number of electrical storage methods have been devised to provide power to a space craft. All of these methods suffer from the inability to provide power in the terrajoule range in response to an immediate demand. The electrical generating methods currently employed for generating and storing power in a space craft include radioactive thermal units, solar cells, fuel cells, chemical reactions and various types of engines and the use of batteries. In all of these cases, the power available upon demand is limited to the amount which can be immediately stored in batteries or in a homodyne generator.

In the case of solar cell power generators, little or no power is generated when the space craft is in the earth's shadow. This requires the space craft to be designed so either power is not required during part of the space craft's orbit or that storage batteries be used to supply needed power.

When storage batteries are used to provide power during periods when little or no power is generated, a problem arises as to the result of the limits in the number of times a battery can be recharged before it degenerates. No currently known battery is capable of being recharged for an unlimited number of times.

In the future, if large space stations become a reality, a method must be devised to permit large amounts of readily convertible power to be stored for use upon demand. It is highly desirable therefore that the power supply be rechargable with little loss occuring as a result of the storage methods for a long period of time. The subject space craft cellular energy generating and storage device provides a means to store large amounts of power for immediate or future use.

The following United States Patents were cited during the prosecution of the parent application. They are U.S. Pat. Nos. 2,153,523 to Roberts et al, 3,144,219 to Schnitzer, 3,248,967 to Lewis, 3,526,795 to Pecs, 3,697,765 to Carini, 3,970,917 to Diggs and Miller et al 14th IEEE Conf. 1-7-80, May Issue 1980, pp. 1018-1024.

SUMMARY OF THE INVENTION

The subject space craft cellular energy generating and storage device provides large amounts of power in space in a form which is available for immediate use. There is no physical limit except for cost to the amount of energy that can be stored by the subject storage device.

The generating and storage device provides a pair of annular rotating housings mounted on a central support shaft having individual compartments. The outer compartments of the housing can be used to house occupants in space. Further, the fact that the housings rotate can be used for providing an artificial gravity to the occupants.

The space craft rotating cellular energy generating and storage device for generating electrical power and storing the power includes an upper and lower annular rotating housings mounted on a central support shaft with a plurality of lower and upper coil windings adjacent to each other and mounted on the upper and lower housings. The upper housing rotates in an opposite direction from the lower rotating housing. The housings include a plurality of individual compartments for holding movable material therein. As power is withdrawn from the device, the material in the compartments may be pumped or moved from the periphery of the housing to the center of the housings thereby changing the rotational energy of the system while at the same time conserving annular velocity.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
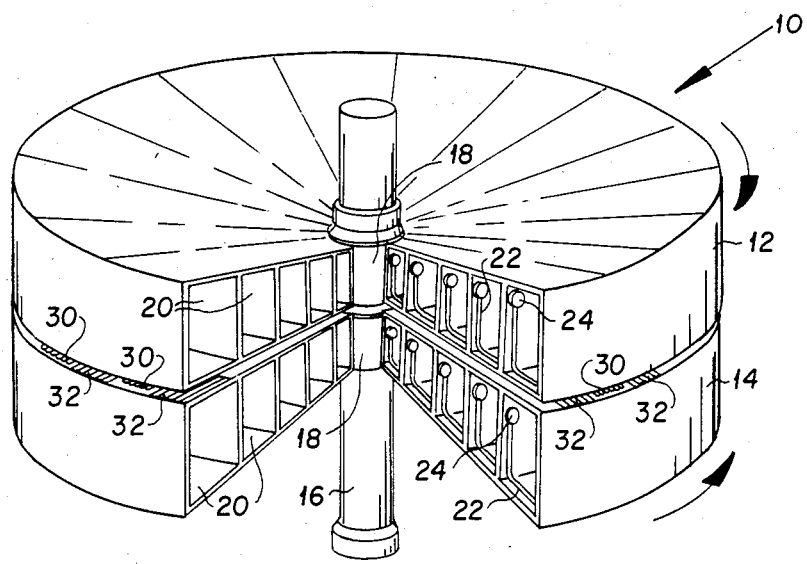
FIG. 1 is a partial cutaway perspective view of the space craft cellular energy generating and storage device of the invention.

In FIG. 1 the space craft cellular energy generating and storage device is designated by general reference numeral 10. The device 10 may also be called a variable inertia cellular electrical power generating and kinetic energy storage device. The device 10 includes an annular upper rotating housing 12 and an annular lower rotating housing 14. Both of the housings 12 and 14 are mounted on a central support shaft 16 having bearings 18 thereon for the housing to rotate on the shaft 16.

Figure 2:
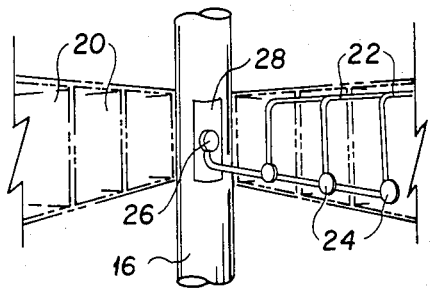
FIG. 2 is a side partial cutaway view of one of the housings mounted on the central support shaft with pump and control system depicted in FIG. 1.
Figure 3:
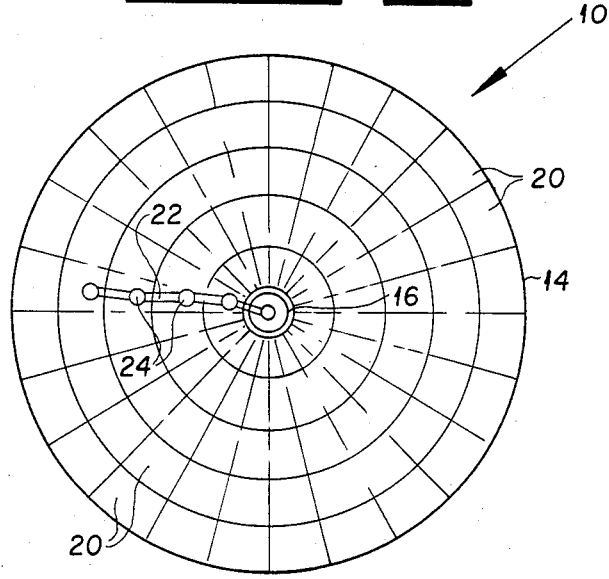
FIG. 3 is a top view of the pumping system for one of the housings of the embodiment depicted in FIG. 1.

Each of the housings 12 and 14 include a plurality of individual compartments 20 used for receiving material therein. Each of the compartments 20 include fill and drain lines 22 with valves 24 connected to a pump 26 with a control system 28 used for removing material in the compartments 20 as energy is used and filling the compartments as the energy is generated. The pump 26 and control system 28 is shown in FIG. 2. FIG. 3 illustrates a top view of the lower housing 14 with the drain lines 22 and valves 24 for controlling material flow to the compartments 20. The drain lines 22, valves 24 and pump 26 may be used to transfer material into inner compartments 20 to maintain a constant rotational velocity while maintaining a higher energy content in the upper housing 12 and lower housing 14.

The upper housing 12 is rotated, for example, in a clockwise direction on the shaft 16 while the lower housing 14 is rotated in a counter-clockwise direction. The two housings 12 and 14 are separated in a spaced relationship with upper coil windings 30 mounted on the bottom of the upper housing 12 and lower coil windings 32 mounted on top of the lower housing 14.

The lower housing 14 may be identical in design to the upper housing 12. The upper or lower coil windings 30 or 32 may be replaced by permanent magnets. The purpose of the coil windings 30 and 32 or magnets are to provide the necessary couplings for a motor generating system connected to an electrical control system. The two systems are located in the central support shaft 16 and are not shown in the drawings. The electrical connections use standard slip rings or other appropriate connections.

It is obvious that an alternate design could place the motor/generator or generator on the central shaft 16. Under these conditions one of the rotating housings 12 is attached to the windings 30 and the other housing 14 to the windings 32.

Figures 4, 5, 6:
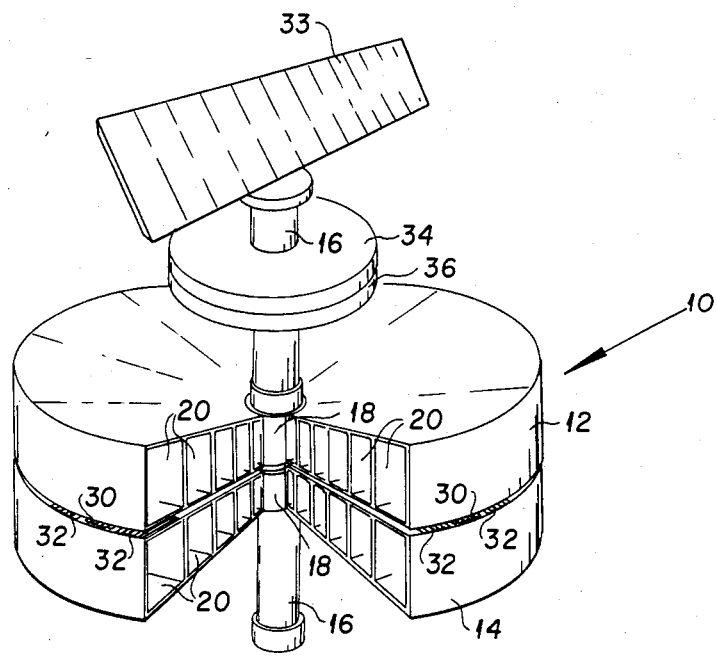
FIG. 4 is a partial cutaway perspective view of an alternate embodiment of the space craft cellular energy generating and storage device of the invention.
FIGS. 5 and 6 are graphical representations of energy level curves vs. disk inertia and disk rpm for the device of the invention.

In operation, the upper and lower housings 12 and 14 can be set in motion using either excess electrical power generated by radioactive thermal units stored in the device 10 or a plurality of solar cells mounted on a solar bank 33 as shown in FIG. 4. The bank 33 is mounted on top of the central support shaft 16. Also, the housings 12 and 14 could be set in motion by rocket engines or other alternate means. When electrical power is used to energize the device 10, the upper and lower coil windings 30 and 32 are put into a motor configuration by the electrical control system to act as a motor. The two rotating housings 12 and 14 are put into motion at a rate dependent on the amount of available energy.

It should be kept in mind that other means such as a rocket engine could be used equally well to set the upper and lower housings 12 and 14 into initial rotating motion. Also using power source engines attached to the sides and top or bottom of the two housings 12 and 14 can work as well.

The central support shaft 16 can be torqued against the upper housing 12 or lower housing 14 as appropriate to offset frictional and other losses in the system to maintain space craft attitude.

When it is necessary to withdraw power from the device 10 the upper and lower coil windings 30 and 32 and the electrical control system is changed so that the two counter rotating housings 12 and 14 act as an electrical generator. As power is withdrawn from the device 10 to maintain constant RPM of the housings 12 and 14, the material stored in the individual storage compartments 20 can be pumped or moved from the outer periphery of the housings to the center of the housings. This changes the rotational inertia of the device 10 while at the same time conserving its annular velocity. In the alternative, the rotation of the two housings 12 and 14 could be allowed to reduce to a pre-determined rate as the power is withdrawn. Permitting this to occur would simplify the plumbing and material transfer of the materials in the individual compartments 20.

It should be kept in mind the size of the housings 12 and 14 are not limited by application. The larger the housing, the more efficient the system and the more power that can be stored and retrieved from the device 10. The size of the two rotating housings 12 and 14 will be determined by the average power required to be generated by the device together with the definition of the maximum amount of time energy will be withdrawn during the periods of usage. It should be obvious that the size of the housings could be 100 feet in diameter or greater.

In FIG. 2 the pump 26 to be used with the invididual compartments 20 is illustrated. Drain lines 22 are interconnected between each of the compartments 20. In each of the compartments 20 the individual valves 24 are electrically controlled to open and close to thereby control material flow between the individual compartments 20. The pump 26 and control system 28 are located in the central support shaft 16. As an alternate, the energy of the material can be used to force the material toward or away from the center of the housings 12 and 14.

In FIG. 4 the device 10 may also include a second upper housing 34 and a lower rotating housing 36 having the same or smaller configuration as the housings 12 and 14 and mounted on the same central support shaft 16. In this embodiment the rotating housings 12 and 14 can be charged by the second upper housing 34 and second lower housing 36. The second upper and lower housings 34 and 36 can be initially charged, for example, by the bank 33 of the solar cells. It can be appreciated that the smaller upper and lower housings 34 and 36 have identical individual compartments, upper and lower coil windings, storage pump with drain and fill lines required to provide an identical energy generating source as described in FIGS. 2 and 3.

It is also obvious that the moving of the material to maintain constant rotating speed is a basic concept. The means to accomplish this can use methods as described above or, it can be appreciated, a series of solid masses that are allowed to slide outwardly towards the periphery of the housing to increase the systems inertia could be used and the masses pulled back toward the center of the housing to decrease the moment of inertia and thereby increase or maintain the speed of the energy generating and storage device.

The device 10 is rotated and inertia controlled as described in the following equations and description of FIGS. 5 through 14.

The moment of inertia of an annulus is given by the relationship $$1 = \tfrac{1}{2} m (R^2_{out} + R^2_{in}).$$

For a disk, it is simply:

$$1 = \tfrac{1}{2} m R^2$$

Since the kinetic energy stored in such an annulus when it is rotating at some angular rate (w) is:

$$RE = \tfrac{1}{2} I w^2$$

it is desirable to maximize either "I" or "w" or both. In current flywheel designs, the path of least resistance has been taken and the rotation rate "w" has been increased. This generally requires a very high speed device with resultant emphasis on flywheel strength. The strength problem results in increasing mass of the flywheel where the majority of the mass must be located near the hub or axis of rotation. This decreases the inertia of the system from that of design where the majority of the mass is located at the rim.

If, in simplified terms, the two design approaches are examined, it is seen that for a flat disk $$KE = \tfrac{1}{2}(\tfrac{1}{2} mR^2)w^2 = \tfrac{1}{4} mR^2 w^2$$

and for an annulus $$KE = \tfrac{1}{2} w^2 (\tfrac{1}{2} m(R^2\text{out} + R^2\text{in}))$$

or $$KE = \tfrac{1}{4} mR^2\text{out } w^2 + \tfrac{1}{4} mR^2\text{in } w^2.$$

It is obvious that for a condition of constant kinetic energy, $$(\tfrac{1}{4} mR^2 w^2)\text{disk} = (\tfrac{1}{4} mw^2(R^2\text{out}+R^2\text{in}))\text{annulus}$$

then it is necessary to trade the mass, radius and rotation rate. It is also obvious that if Rout≈Rin then the annulus has nearly twice the kinetic energy of the disk.

Assume now that it is desired to extract energy from both a rotating solid disk and from a rotating annulus. Two things become obvious at this point. First, for a solid disk ($\tfrac{1}{4} mR^2 w^2$) with fixed mass (m) and radius (R); the only parameter that can be changed is the rotation rate (w). Secondly, to extract the energy, assuming a reasonable generator efficiency and, unless a gear box, a governor, and a clutch are used, a constant electrical power output cannot be obtained because the rotation rate (w) or n (in RPM) is constantly decreasing. This is illustrated in FIGS. 5 and 6 where the effect of energy extraction is measured against rotating disk inertia and disk RPM.

Since the mass and the inertia are fixed, the disc RPM must be reduced if the total energy in the system is reduced.

Figure 7:
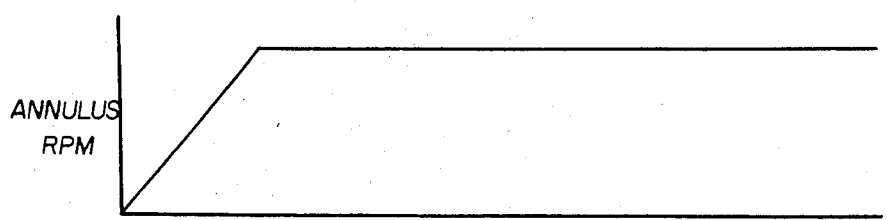
FIGS. 7 and 8 are graphical representations of the effect of energy extraction by changing annulus mass in the device of the invention.
Figure 8:
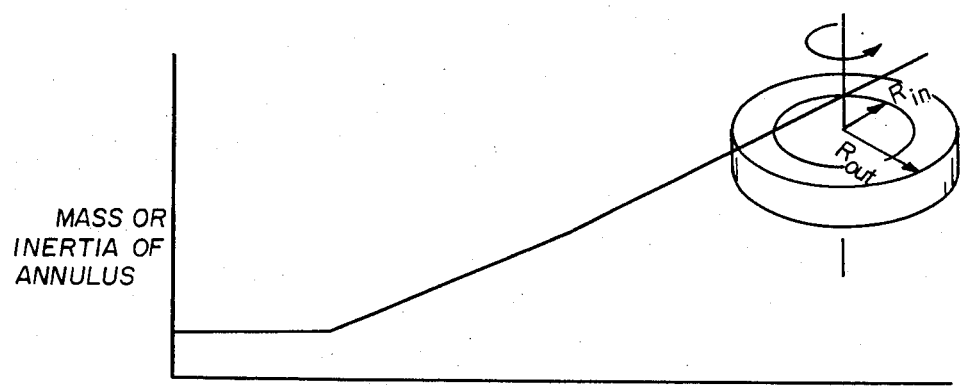

A variable inertia system is shown for contrast in FIGS. 7 and 8. These figures show that the RPM of the annulus can be made a constant provided that the inertia is changed. The inertia is changed either by reducing the mass of the annulus or by changing the distribution of mass within the annulus such that the effective inside and outside annulus radii are changed. Mass is changed by releasing fluid under the influence of pumps or centrifugal force whereas the effective radius of the annulus is changed by pumping fluids or otherwise changing the mass from the outside chambers to chambers closer to the center of axis of rotation.

The need for rotation and inertia control has therefore been established. Control of these two parameters is accomplished in a rather standard force measurement/feedback scheme. This is illustrated in FIG. 9.

Figure 9:
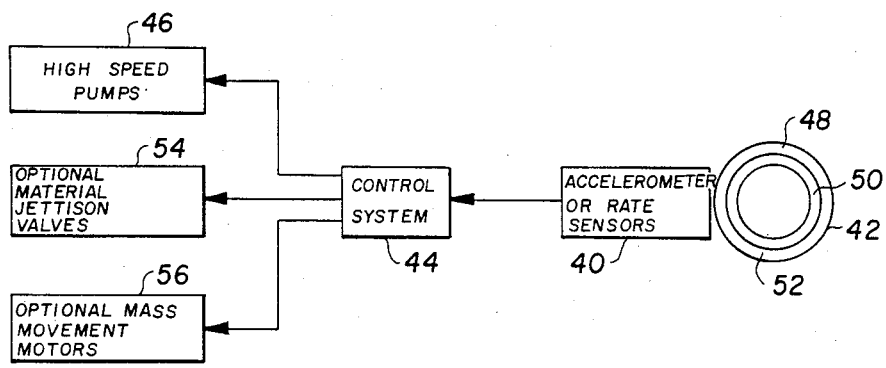
FIG. 9 is a diagrammatic representation of the basic rotation and inertia controller of the invention.

In FIG. 9 an accelerometer or rate sensor 40 is attached to a rotating element 42. The rate sensor 40, in common use as a motion changing sensing device, responds to any change in RPM of the rotating element 42 by sensing a force change in the sensitive element. A control system 44 responds to the change in RPM by activating one or more high speed pumps 46. These pumps 46 transfer fluid from an outer chamber 48 to an inner chamber 50 thereby keeping the rotation rate, as shown in FIG. 7, a constant It is noted that a movable mass 52 can either be shifted from outer to inner chambers, i.e., chamber 48 to 50, and effectively reducing the outside radius of the rotating element 42; or by either pumping the material 52 from the chamber 48 away from the rotating element or by alternately opening valves 54 and using the centrifugal forces to jettison the material from the rotating element thereby reducing the total mass of the rotating element. An obvious alternate is to use motors 56 to pull material from a position of large radius to smaller radius.

The accuracy to which the RPM of the rotation element can be held a constant is dependent upon the rate at which energy is extracted from the system, the magnitude of the stored energy as compared with the extracted energy and the capability of the high speed pumps 46 or other mechanisms to respond to the control system commands.

Figure 10:
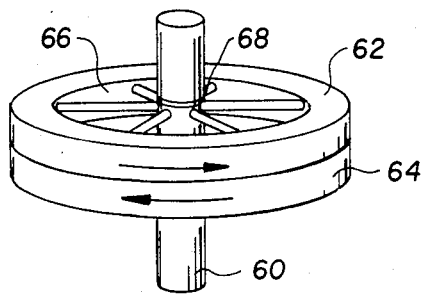
FIG. 10 is a perspective view of the device of the invention depicting counter-rotating elements of the energy generating and storage device.

The basic design of the Variable Inertia Energy Storage and Electrical Power Generating and Storage Device 10 consists of two counterrotating elements as illustrated in FIG. 10.

Alignment of the two counterrotating elements can be accomplished by a variety of methods. It should first be pointed out that this invention is not limited to two counterrotating elements. Any even number of elements can be used since it is desired to balance the opposing torques generated as energy is extracted from the system.

Figure 11:
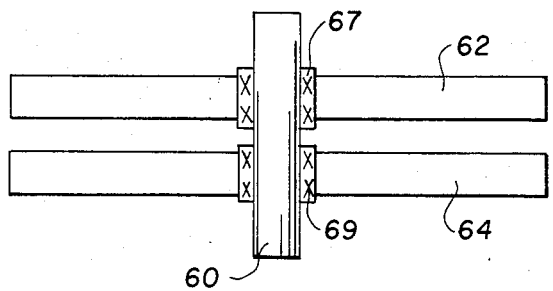
FIG. 11 illustrates bearing alignment for space environment use of the device of the invention.

Alignment of the rotating elements in a space environment is accomplished in different ways dependent upon the structure design. In FIG. 10, an alignment shaft 60 is used as the central support about which the two annuli 62 and 64 rotate. The annuli are attached through a support structure 66 to an alignment bearing 68. This design is particularly suited to a space application since the forces tending to misalign the rotating elements are small. In this design, alignment and rotating member spacing is accomplished using a relatively standard set of space qualified bearings that connect the support structure 66 to the alignment shaft 60. This is illustrated in FIG. 11.

To minimize frictional losses, top and bottom bearings 67 and 69 can be either electromagnetic or permanent magnets. Since the forces tending to move the two elements are low, permanent magnets may provide a low energy loss bearing.

In summary, except for size, methods commonly used to design rotating disks in a computer memory bank meet the alignment and accuracy needs of the energy storage system for space applications. For an unmanned system, the ratio of the diameter of the bearing to the diameter of the rotating elements should be small to minimize frictional losses.

An earth-based energy storage system will preferrable use a different bearing arrangement to maintain alignment and to minimize energy losses due to rotation. The preferred method is illustrated in FIG. 12.

Figure 12:
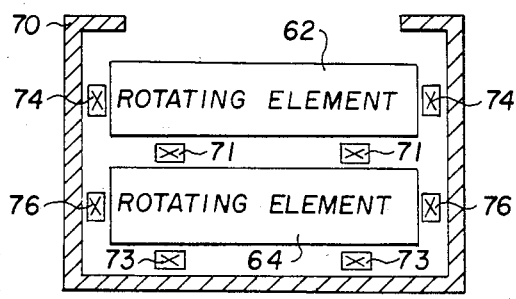
FIG. 12 illustrates bearing alignment for an earth fixed or mobile system in accordance with the invention.

In FIG. 12 rotating elements 62 and 64 are placed in a support frame 70. Although the support frame 70 is not required for all applications, it reduces the complexity of the upper and lower support bearings 71 and 73. Upper support bearing 71 is fixed and attached to both rotating elements 62 and 64. This bearing maintains proper separation and alignment between the upper and lower elements. Lower support bearing 73 is attached to the fixed support frame 70 and to the rotating element 64. As a precautionary measure, upper and lower side bearings 74 and 76 may be attached between the support frame 70 and rotating elements 62 and 64 to assure that side loads are eliminated and that lateral alignment is maintained.

The bearings are not described in detail since they are current state-of-art bearings commonly used on Army tanks and large turnstiles. These precision bearings can be accurately positioned to assure that the electrical element of the motor/generator system are aligned.

Since a common DC motor can also operate as a generator if an external motive force is applied, such a device is ideally suited to the subject Variable Inertia Energy Storage and Electrical Power Generating Device 10. Whether the device 10 performs as a generator of electrical power or as a motor to increase the kinetic energy depends upon whether electrical power is being supplied to the coils or extracted from the coils.

Figure 13:
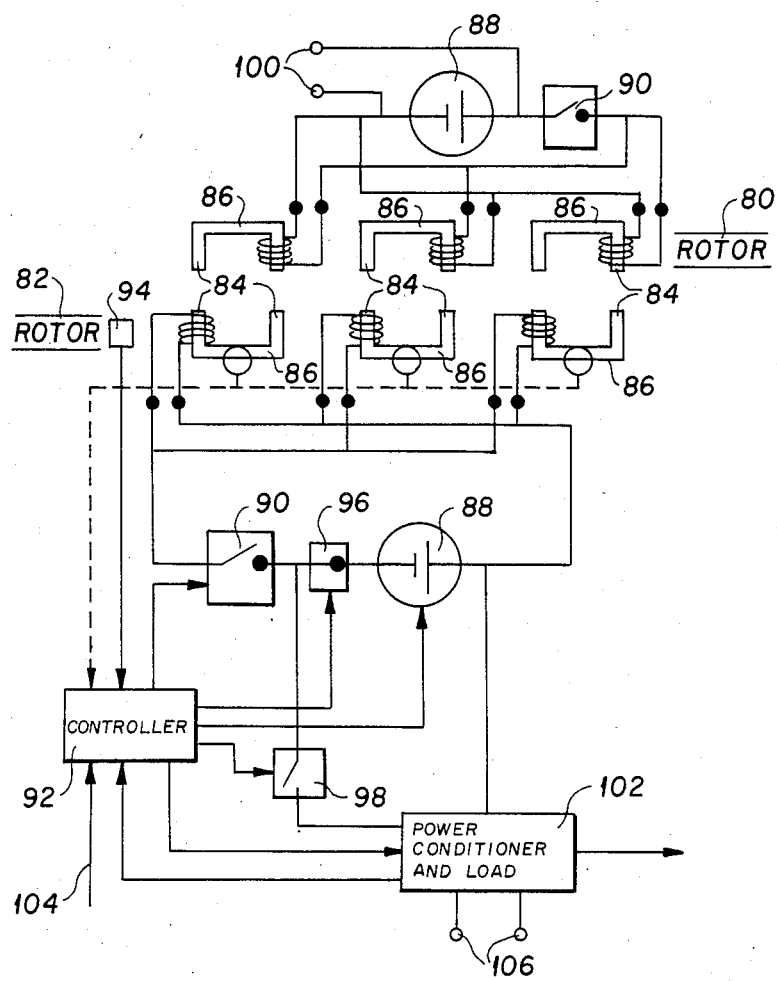
FIGS. 13 and 14 diagrammatically illustrate typical motor and generator control systems for the storage device.
Figure 14:
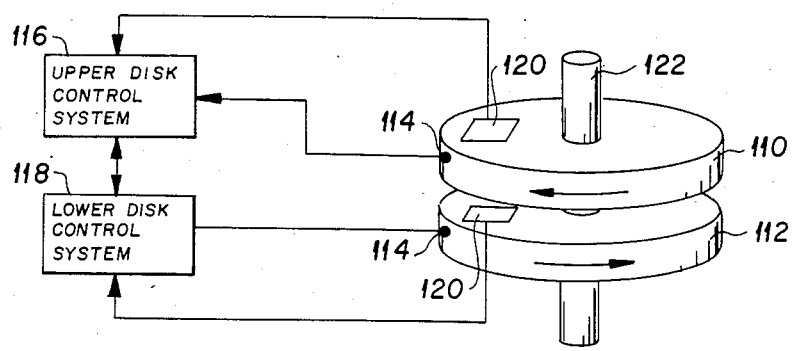

A motor concept is illustrated in FIG. 13 In this figure, two rotors are identified as rotor 80 and rotor 82. Poles 84 are placed such that they are perpendicular to the edge of the rotors. On rotor 80, the poles are wound electromagnets 86 with power supplied by a fixed power supply 88. This power supply is unswitched. It can be fed by batteries, solar cells, or any other regulated source of electrical power. In a generator configuration, the power source is regulated. The electromagnets 86 are wired such that each electromagnetic around the periphery has alternating polarities.

Rotor 82 has an identical set of electromagnets 86 that are wired to a commutated electrical power supply 88. This commutated power supply 88 reverses the direction of current flow through the electromagnets 86 in rotor 82 so as to maintain the attraction/repulsion characteristics of the electromagnets. A control swith 90 is provided to modulate the frequency of the commutation. A controller 92 monitors the position of the electromagnets using a Hall effect sensor 94. The controller 92 then changes the commutation rate alternately by opening or closing the control switches 90.

In FIG. 13, a motor swtich 96 is closed thereby energize the poles. Opening of motor switch 96 removes the commutated power supply 88 from the circuit. Closing a generator switch 98 places the system in a generating mode. The rate at which electrical energy is extracted from the system is dependent upon the current flow through the poles on rotor 80. A generator feedback circuit 100 is provided from a power conditioner and load 102 to increase current flow through the poles 84 to meet the external demands and control commands 104. As more electrical power is needed by output load 106 feedback is provided to the controller 92 which increases the current in the electromagnets 86 on rotor 80 through the feedback circuit 100.

The device 10 can operate as a motor or a generator, in conformance with the discussion above. The concern of how the upper housing 12 charges the lower housing 14 shown in FIG. 1 is important from the following aspect. Assume that the upper housing is defined to be upper disk 110 and the lower housing 14 is the lower disk 112 in FIG. 14. If the inertia of either disk 110 or 112 is less than the other, then the disk with the lesser moment of inertia will, with a constant torque generated by an external source (see FIG. 13), rotate at a faster rate than will the disk with the high moment of inertia. If this is allowed to proceed, then one disk will reach its maximum allowable speed while the other disk is moving at a reduced RPM.

Under FIGS. 5, 6, 7 and 8 of this discussion, detail is provided in the method used to move mass from the outer rim to the inside of the rotors to reduce the moment of inertia and thereby increase or maintain the RPM of the rotor as a constant. This same methodology is used to maintain a constant or desired RPM of each disk 110 and 112.

The speed or rotation rate of the upper 110 and lower 112 discs is determined by rate sensors 114 mounted in the outside periphery of the disk. An upper disk control system 116 and lower disk control system 118 are interconnected. These controllers monitor the differences in rotation rate and activate pumps 120 to either move mass toward the peripheries or towards the center of each disk as necessary to maintain a desired rotation rate relative to an external frame of reference. This frame of reference is ideally located in the axis of rotation 122. Its purpose is to provide an inertially stabilized frame of reference for all relative motions. It is noted that this inertial frame of reference is not critical to the invention since the rate sensors 114 or accelerometer outputs can be calibrated in terms of forces to provide a measurement of RPM.

Changes may be made in the construction and arrangement of the parts or elements of the embodiments as described herein without departing from the spirit or scope of the invention defined in the following claims.

What is claimed is:

1. A variable inertia electrical power generating and kinetic energy storage device for generating electrical power and for storing kinetic energy for extending periods of time, the device comprising:
    an annular upper housing rotatably mounted on a central support shaft;
    an annular lower housing rotatably mounted on the central support shaft and disposed in spaced relationship below the upper housing;
    a plurality of upper coil windings mounted on the bottom of the upper rotating housing and a plurality of lower coil windings mounted on the top of the lower rotating housing, the upper and lower coil windings being disposed adjacent to each other and being disposed for rotation with the respective upper and lower housings in opposite directions for generating electrical power;
    a plurality of individual storage compartments in the upper and lower housings for holding a movable material therein;
    means for removing the material in the compartments as enery is used and for filling the compartments as energy is stored; and
    auxiliary power means for initially rotating the upper and lower housings to a predetermined speed and for periodically maintaining the pre-determined speed as the need is required.

2. The device as described in claim 1 wherein the auxiliary power means is a plurality of solar cells mounted on top of the central support.

3. The device as described in claim 1 wherein the auxiliary power means is radioactive thermal units mounted on the central support shaft or in the upper or lower rotating housing.

4. The device as described in claim 1 wherein the means for removing and filling the compartments in the upper and lower housings is a support pump connected to individual fill and drain lines leading to each compartment in the housings.

5. A variable inertia electric power generating and kinetic energy storage device for generating electric power and for storing kinetic energy for extended periods of time, the device comprising:

a first annular upper housing rotatably mounted on a central support shaft;

a first annular lower housing rotatably on the central support shaft and disposed in spaced relationship below the first upper housing;

a plurality of upper coil windings mounted on the bottom of the first upper housing and a plurality of lower coil windings mounted in the top of the first lower housing, the upper coil windings being disposed in a spaced relationship adjacent the lower coil windings for generating electric power, the first upper housing being disposed for rotation in one direction and the first lower housing being disposed for rotation in an opposite direction;

a plurality of individual storage compartments in the first upper and lower housings for holding movable material tnerein;

means for removing the material in the compartments as energy is used and for filling the compartments as energy is stored;

a second annular upper housing rotatably mounted on the central support shaft;

a second annular lower housing rotatably mounted on the central support shaft, the second lower housing disposed in a spaced relationship below the bottom of the second upper housing;

a plurality of coil windings mounted in the bottom of the second upper housing and in the top of the second lower housing, the lower coil winding being disposed in a spaced relationship adjacent the upper coil windings for generating electrical power, the second upper and lower housings being disposed for rotation in opposite directions, the second upper and lower housings providing auxiliary power means for initially rotating the first upper and lower housings to a predetermined speed and for periodically maintaining the predetermined speed as the need is required.

6. The device as described in claim 5 wherein solar cells are mounted on top of the central support shaft for providing power to the second rotating housings during initial start up of the housings and periodically maintaining power to the housings as the need is required.

7. The device as described in claim 5 wherein rocket engines or the like are mounted on the second rotating housings to provide rotational energy and for periodically maintaining power to the housings as the need is required.

* * * * *